(12) United States Patent
Zheng et al.

(10) Patent No.: US 9,817,224 B2
(45) Date of Patent: Nov. 14, 2017

(54) METHODS AND SYSTEMS FOR FOURIER PTYCHOGRAPHIC IMAGING

(71) Applicant: University of Connecticut, Farmington, CT (US)

(72) Inventors: Guoan Zheng, Farmington, CT (US); Siyuan Dong, Farmington, CT (US)

(73) Assignee: University of Connecticut, Farmington, CT (US)

(*) Notice: Subject to any disclaimer, the term of this patent is extended or adjusted under 35 U.S.C. 154(b) by 252 days.

(21) Appl. No.: 14/700,792

(22) Filed: Apr. 30, 2015

(65) Prior Publication Data

US 2015/0317508 A1  Nov. 5, 2015

Related U.S. Application Data

(60) Provisional application No. 61/986,367, filed on Apr. 30, 2014, provisional application No. 62/001,876, filed on May 22, 2014.

(51) Int. Cl.
| | | |
|---|---|---|
| *H04N 7/18* | (2006.01) | |
| *G02B 21/36* | (2006.01) | |
| *G06K 9/00* | (2006.01) | |
| *G02B 27/58* | (2006.01) | |
| *G02B 21/00* | (2006.01) | |
| *G02B 21/24* | (2006.01) | |
| *G02B 21/08* | (2006.01) | |

(Continued)

(52) U.S. Cl.
CPC ......... *G02B 21/367* (2013.01); *G02B 21/002* (2013.01); *G02B 21/0032* (2013.01);
(Continued)

(58) Field of Classification Search
CPC .. G02B 21/367; G02B 21/086; G02B 21/365; G02B 21/002; G02B 21/0032;
(Continued)

(56) References Cited

U.S. PATENT DOCUMENTS

2007/0159639 A1* 7/2007 Teramura ........... G01B 9/02044
                                                     356/485
2013/0182096 A1* 7/2013 Boccara ............... A61B 5/0066
                                                     348/79

(Continued)

OTHER PUBLICATIONS

Dong, et al., "Spectral multiplexing and coherent-state decomposition in Fourier ptychographic imaging," Biomedical Optics Express, 5(6): 1757-1767, May 2014.
(Continued)

*Primary Examiner* — Allen Wong
(74) *Attorney, Agent, or Firm* — McDonnell Boehnen Hulbert & Berghoff LLP

(57) ABSTRACT

In one aspect, the present disclosure provides a system for Fourier ptychographic microscopy, the system comprising (i) an image capture apparatus including an objective lens, (ii) at least one processor, and (iii) data storage including program instructions stored thereon that when executed by the at least one processor, cause the system to: (a) capture, via the image capture apparatus, a plurality of initial images of an object, wherein each of the plurality of initial images of the object have a first resolution, and (b) process each of the plurality of initial images in Fourier space to generate a final image of the object having a second resolution, wherein the second resolution is greater than the first resolution.

20 Claims, 8 Drawing Sheets

(52) U.S. Cl.
CPC ......... *G02B 21/086* (2013.01); *G02B 21/241* (2013.01); *G02B 21/365* (2013.01); *G02B 27/58* (2013.01); *G06K 9/00* (2013.01); *G06K 9/00134* (2013.01)

(58) Field of Classification Search
CPC ........ G02B 21/241; G02B 27/58; G06K 9/00; G06K 9/00134
USPC .......................................................... 348/80
See application file for complete search history.

(56) References Cited

U.S. PATENT DOCUMENTS

| | | |
|---|---|---|
| 2014/0118529 A1 | 5/2014 | Zheng et al. |
| 2014/0126691 A1 | 5/2014 | Zheng et al. |
| 2014/0347672 A1* | 11/2014 | Pavillon ............... A61B 5/0066 356/491 |
| 2014/0368812 A1* | 12/2014 | Humphry ............... G01B 11/24 356/124 |
| 2015/0036038 A1 | 2/2015 | Horstmeyer et al. |
| 2015/0054979 A1 | 2/2015 | Ou et al. |
| 2015/0160450 A1 | 6/2015 | Ou et al. |

OTHER PUBLICATIONS

Dong, et al., "Aperture-scanning Fourier ptychography for 3D refocusing and super-resolution macroscopic imaging," Optic Express, 22(11): 13586-13599, May 2014.

Dong, et al., "High-resolution fluorescence imaging via pattern-illuminated Fourier ptychography," Optics Express, 22 (17):20856-20870, Aug. 2014.

* cited by examiner

METHODS AND SYSTEMS FOR FOURIER PTYCHOGRAPHIC IMAGING

CROSS-REFERENCE TO RELATED APPLICATIONS

This application claims the benefit of the filing date of U.S. Provisional Patent Application Ser. No. 61/986,367, filed Apr. 30, 2014, and U.S. Provisional Patent Application Ser. No. 62/001,876, filed May 22, 2014, both of which are hereby incorporated by reference in their entirety.

BACKGROUND

In most imaging setups, the resolution is determined by the numerical aperture of the employed objective lens and the associated optical aberrations. Artificially increasing the space-bandwidth product (SBP) of an imaging system by mechanical means is suboptimal, as it requires precise control over actuation, optical alignment and motion tracking. Furthermore, a mechanical solution simply accepts the intrinsic resolution limit of a conventional microscope's optics, neglecting the computationally addressable problem of resolution enhancement. Lensless microscopy methods such as digital in-line holography and contact-imaging microscopy offer unique imaging capabilities, but also present certain drawbacks. For example, digital in-line holography does not work well for contiguous samples, and contact-imaging microscopy requires a sample to be in close proximity to the sensor.

The current disclosure provides methods and systems that are capable of recovering sample images that bypass the resolution limit of the employed objective lens and correct for the associated optical aberrations. The basic idea of the disclosed methods and systems is to acquire multiple images of the sample by projecting different illumination patterns onto the sample, or by scanning an aperture at the pupil plane of the imaging system. The acquired images will then be digitally processed to recover the high-resolution information beyond the resolution limit of the employed optics, to recover spectral information of the sample, and/or to correct for aberrations of the employed optics.

SUMMARY OF THE INVENTION

In one aspect, the present disclosure provides a system for Fourier ptychographic microscopy (FPM), the system comprising (i) an image capture apparatus including an objective lens, (ii) at least one processor, and (iii) data storage including program instructions stored thereon that when executed by the at least one processor, cause the system to: (a) capture, via the image capture apparatus, a plurality of initial images of an object, wherein each of the plurality of initial images of the object have a first resolution, and (b) process each of the plurality of initial images in Fourier space to generate a final image of the object having a second resolution, wherein the second resolution is greater than the first resolution.

In another aspect, the present disclosure provides a method for structured-illumination-based Fourier ptychographic microscopy (SFPM). The method may include (i) capturing, via an objective lens, a plurality of initial images of an object, wherein the plurality of initial images of the object have a first resolution, and (ii) processing each of the plurality of initial images to generate a final image of the object having a second resolution, wherein the second resolution is greater than the first resolution, and wherein the processing comprises: (a) generating an initial estimate image for a high-resolution image of the object, (b) multiplying the initial estimate image with an illumination pattern to generate a target image of the object, (c) transforming the target image to the Fourier domain to generate a Fourier transform of the target image, (d) transforming the Fourier transform of the target image to the spatial domain to generate an updated target image, (e) replacing the initial estimate image of the object with the updated target image, (f) repeating steps (b)-(e) for each of the plurality of initial images of the object, and (g) iteratively repeating steps (b)-(f) to generate the final image of the object.

In yet another embodiment, the present disclosure provides a method for spectrum multiplexing in structured-illumination-based Fourier ptychographic microscopy. The method may include (i) capturing, via an objective lens, a plurality of initial images of an object, wherein the plurality of initial images of the object have a first resolution, and (ii) processing each of the plurality of initial images to generate a final image of the object having a second resolution, wherein the second resolution is greater than the first resolution, and wherein the processing comprises: (a) generating a first initial estimate image for a high-resolution image of the object at a first wavelength, (b) generating a second initial estimate image for a high-resolution image of the object at a second wavelength, (c) multiplying the first and second initial estimates with an illumination pattern to generate a first target image and a second target image of the object, (d) transforming the first target image and the second target image to the Fourier domain to generate a Fourier transform of the first target image and second target image, (e) transforming the Fourier transform of the first target image and second target image to the spatial domain to generate an updated first target image and updated second target image, (f) replacing the first initial estimate image of the object with the first updated target image and the second initial estimate image of the object with the second updated target image, (g) repeating steps (c)-(f) for each of the plurality of initial images of the object, and (h) iteratively repeating steps (c)-(g) to generate the final image of the object.

These as well as other aspects, advantages, and alternatives, will become apparent to those of ordinary skill in the art by reading the following detailed description, with reference where appropriate to the accompanying drawings.

DETAILED DESCRIPTION

Figure 1:
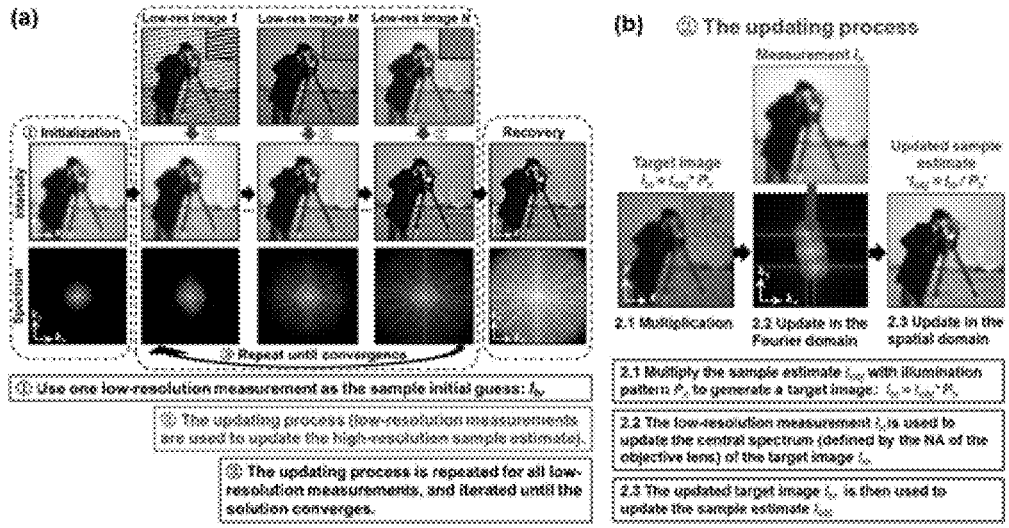
FIG. 1 illustrates the proposed recovery process for structure illumination microscopy.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

The disclosure contained herein is in the general field of microscopic imaging, and more particularly, in the field of Fourier ptychographic imaging, including structured-illumination-based Fourier ptychographic microscopy (SFPM), spectrum multiplexing Fourier ptychography, and several Fourier ptychographic imaging schemes.

The basic idea of Fourier ptychographic imaging is to use multiple non-uniform patterns for sample illumination and capture the corresponding images of the sample. The resolution of these raw images is determined by the numerical aperture of the employed optics. The captured images will be then digitally processed to recover the high-resolution information and the spectral information. The illumination patterns can be plane waves with different incident angles (coherent Fourier ptychography) or different intensity patterns (incoherent Fourier ptychography, or structured-illumination-based Fourier ptychography). The final achievable resolution is not determined by the employed objective lens. For coherent Fourier ptychography, the final resolution is determined by the largest incident angle of plane wave. For incoherent Fourier ptychography, the final resolution is determined by the smallest speckle size of the intensity pattern.

Fourier ptychography can also be implemented in the detection path. In this case, an aperture is placed at the pupil plane of the imaging system and the aperture is scanned through different positions and the corresponding captured images are used for image reconstruction.

In particular, SFPM uses an iterative recovery framework to generate a final image having a greater resolution than images captured with an objective lens of the system. In this framework, program instructions may cause one or more processors may alternatively impose the intensity constraint in the spatial domain and the objective's transfer function constraint in the Fourier domain. Different from the conventional structured illumination imaging techniques, the proposed frame work requires no phase shifting in the acquisition process and any unknown speckle pattern can be used for sample illumination. As such, the proposed framework is able to recover both the high-resolution image and the high-resolution unknown illumination pattern simultaneously. Furthermore, wavelength multiplexing can be performed in the proposed framework without involving spectral filters.

Described herein are systems and methods for Fourier microscopy. An example system may include (i) an image capture apparatus including an objective lens, (ii) at least one processor, and (iii) data storage including program instructions stored thereon that when executed by the at least one processor, cause the system to: (a) capture, via the image capture apparatus, a plurality of initial images of an object, wherein each of the plurality of initial images of the object have a first resolution, and (b) process each of the plurality of initial images in Fourier space to generate a final image of the object having a second resolution, wherein the second resolution is greater than the first resolution.

With reference to the Figures, FIG. 1 illustrates the proposed recovery process for structure illumination microscopy. In particular, FIG. 1 illustrates a 'camera man' as a simulated object $I_{obj}$. The program instructions may cause one or more processors to multiplied $I_{obj}$ with different illumination patterns object $P_n$ (n=1, 2, 3 . . . ) and the resulting images $I_{obj}P_n$ (n=1, 2, 3 . . . ) are low-pass filtered to produce low-resolution acquisitions $I_n$ (simulating the filtering process of the objective lens). In this demonstration, sinusoidal patterns may be used for sample illumination as shown in the top part of FIG. 1(a)). The low-resolution acquisitions $I_n$ may then be used to recover the high-resolution object image following the procedures shown in FIG. 1.

There are three major steps in the proposed recovery process. First, the one or more processors generate a high-resolution initial guess for the object, $I_{obj}$. In one example, the low-resolution measurement is used as the initial guess. Second, the one or more processors multiply the $I_{obj}$ with the $n^{th}$ illumination pattern $P_n$ to generate a target image $I_{tn}=I_{obj}P_n$ (step 2.1 in FIG. 1). This target image is then transformed to the Fourier domain and updated by the low-resolution measurement $I_n$ (step 2.2 in FIG. 1). The Fourier updating process can be express as:

$$\mathcal{F}(I_{tn})^{updated} = \mathcal{F}(I_{tn}) + \frac{conj(OTF)}{\max(OTF)} \cdot (\mathcal{F}(I_n) - OTF \cdot \mathcal{F}(I_{tn})), \quad (1)$$

where $\mathcal{F}$ denotes the Fourier transform, conj demotes the complex conjugate, and OTF denotes the incoherent optical transfer function of the objective lens. The term $\mathcal{F}(I_{tn})^{updated}$ is then transformed back to the spatial domain to produce an updated target image $I_{tn}^{updated}$. This updated target image is used to update the high resolution sample estimate using the following equation (step 2.3 in FIG. 1):

$$I_{obj}^{updated} = I_{obj} + \frac{conj(P_n)}{\max(P_n)} \cdot (I_{tn}^{updated} - I_{obj} \cdot P_n) \quad (2)$$

Third, the Fourier and spatial updating process (FIG. 1(b)) is repeated for all different illumination patterns and iterated until the solution converges.

From Equations (1) and (2) above, it is evident that there is no requirement on the shape of the illumination pattern $P_n$. Any illumination pattern can be used in the SFPM approach, as long as it contains high-frequency component.

Figure 2:
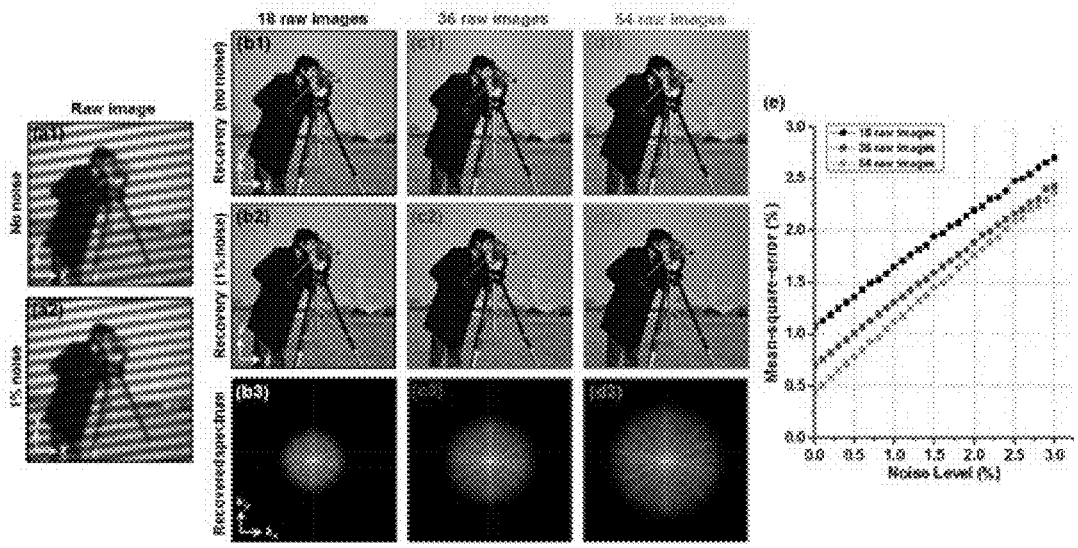
FIG. 2 illustrates the application of the SFPM approach for sinusoidal illumination pattern

In one example, the illumination pattern may be a sinusoidal pattern. FIG. 2 demonstrates the application of the SFPM approach for sinusoidal illumination pattern. FIGS. 2(a1)-(a2) show two low-resolution raw images, one without noise and one with 1% noise. FIGS. 2(b)-(d) demonstrate the recovery results using the SFPM approach. In FIG. 2(b), 18 raw low-resolution images corresponding to 18 different sinusoidal patterns (one sinusoidal frequency, 18 different orientations) were used for the recovery. In FIG. 2(c), 36 low-resolution images corresponding to 36 different sinusoidal patterns (two sinusoidal frequencies, 18 different orientations for each frequency) were used for the recovery. FIG. 2(d) shows the recovery results using 54 low-resolution images (three sinusoidal frequencies, 18 different orientations for each frequency). As shown in FIG. 2, the larger the number of raw images, the better the final reconstruction. FIG. 2(e) illustrates a plot of the mean-square-error as a function of noise. As shown in FIG. 2(e), the error linearly depends on the input noise. Therefore, the SFPM approach is robust to the additive noise.

Compared to the conventional structured illumination microscopy approach, the SFPM approach reported here does not require phase stepping of the sinusoidal pattern. Thus, no phase stepping element is needed in the SFPM setup. In a typical implementation of structured illumination microscopy, three different lateral phase shifts are needed for each orientation of the sinusoidal pattern, and three different orientations are needed to double the resolution isotopically. Therefore, at least nine images are needed in a typical implementation. Since the SFPM approach does not require phase shift of the sinusoidal pattern, it only need a minimum number of three sinusoidal patterns with different orientations to double the resolution, shortening the acquisition time by three folds.

Figure 3:
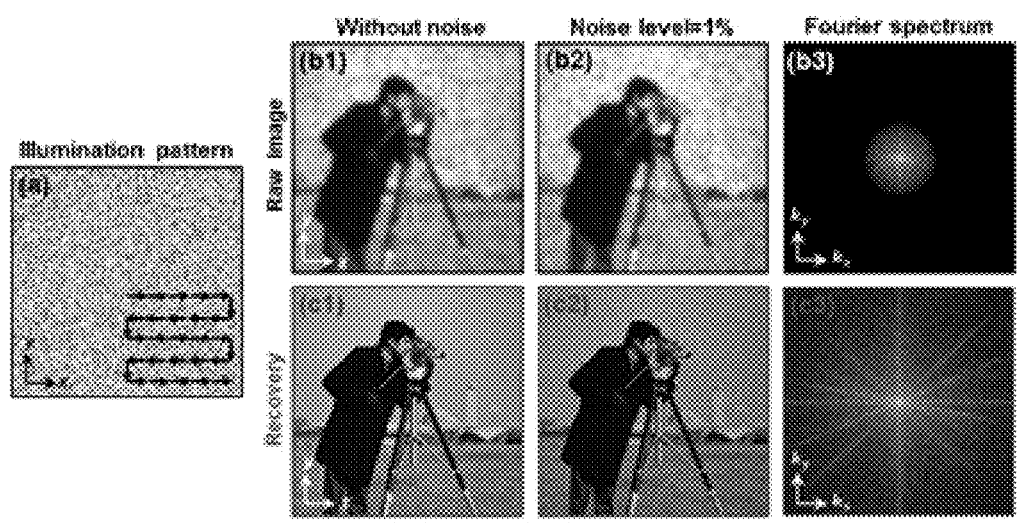
FIG. 3 illustrates the use of a random, but known, illumination patterns in the SFPM approach.

In addition to sinusoidal illumination patterns, SFPM is able to use any random pattern for sample illumination. FIG. 3 demonstrates the use of a random (but known) illumination pattern in the SFPM approach. FIG. 3(a) shows the illumination pattern and its scanning path over the sample (90-step raster scanning) FIGS. 3(b1)-(b2) show two low-resolution images under the random pattern illumination, one without noise and one with 1% noise. FIG. 3(b3) is the Fourier spectrum of FIG. 3(b1). The corresponding SFPM recovered results (using 90 low-resolution images) are shown in FIGS. 3(c1)-(c3). As illustrated in FIG. 3, any illumination pattern, as long as it contains high-frequency component, can be used in the SFPM approach.

In most practical experimental settings, it is difficult to precisely characterize the illumination pattern. Therefore, the capability of recovering the unknown illumination pattern is very important for the structured illumination microscopy setting.

In such a scenario, the system may use one unknown pattern to illuminate the sample and use a low-resolution objective lens for image acquisition. The system may acquire multiple low-resolution images of the sample by rotating or translating the unknown illumination pattern over the sample (or rotating/translating the sample itself). In this case, the one or more processors may use the acquired low-resolution images $I_n$ (n=1, 2, 3 . . . ) to recover both the high-resolution sample image $I_{obj}$ and the unknown illumination pattern $P_{unknown}$ in the iterative process. The recovery procedures for the sample image $I_{obj}$ are the same as those discussed above in relation to FIG. 1. In this case, 'step 2.4' is added (after the step 2.3 in FIG. 1) for updating the unknown illumination pattern:

$$P_{unknown}^{updated} = P_{unknown} + \frac{conj(I_{obj})}{\max(I_{obj})} \cdot \left(I_{tn}^{updated} - I_{obj} \cdot P_{unknown}\right), \quad (3)$$

Figure 4:
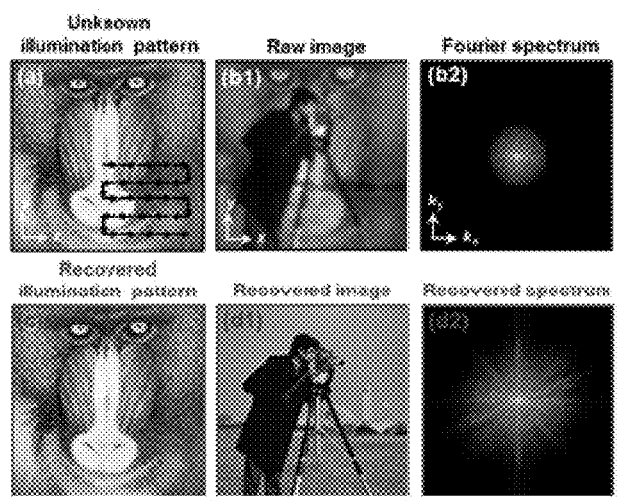
FIG. 4 illustrates the use of the modified SFPM scheme for recovering both the high-resolution sample image and the unknown illumination pattern.

FIG. 4 demonstrates the use of the modified SFPM scheme for recovering both the high-resolution sample image and the unknown illumination pattern. FIG. 4(a) shows the unknown illumination pattern and its scanning path over the sample (raster scanning, 90 steps). FIGS. 4(b1)-(b2) show the low-resolution raw image and its corresponding Fourier spectrum. FIG. 4(c) demonstrates the recovered illumination pattern using Equation (3). The recovered sample image and its Fourier spectrum are shown in FIGS. 4(d1)-(d2).

Information multiplexing may be particularly useful for biomedical imaging and chemical sensing. In this section, a spectrum-multiplexed SFPM scheme is discussed. In such an embodiment, images with different wavelengths can be recovered without using any spectral filter. Therefore, it can be used to replace the filter elements in the fluorescent microscopy setting. As discussed in more detail below, the spectrum-multiplexed SFPM scheme may be used to separate two images at two different wavelengths using the spectrum-multiplexed SFPM scheme. It is also possible to extend these procedures for handling more than two wavelengths.

There are three main steps in the spectrum-multiplexed SFPM scheme. First, the one or more processors generate two high-resolution sample estimates corresponding to two different wavelengths: $I_{obj\_r}$ and $I_{obj\_g}$ ('r' and 'g' denote red and green). These two initial guesses can be a constant number. Second, the one or more processors multiply $I_{obj\_r}$ and $I_{obj\_g}$ with the $n^{th}$ illumination pattern $P_n$ and generate two target images $I_{tn\_r} = I_{obj\_r} P_n$ and $I_{tn\_g} = I_{obj\_g} P_n$. Next, two images $I_{un\_r}$ and $I_{un\_g}$ are generated for the updating process:

$$I_{un\_r} = I_{tn\_r} \cdot I_n / (I_{tn_r} + I_{tn_g}) \quad (4)$$

$$I_{un\_g} = I_{tn\_g} \cdot I_n / (I_{tn_r} + I_{tn_g}), \quad (5)$$

Next, the target images are updated as follow:

$$\mathcal{F}(I_{tn\_r})^{updated} = \mathcal{F}(I_{tn\_r}) + \frac{conj(OTF_r)}{\max(OTF_r)} \cdot (\mathcal{F}(I_{un\_r}) - OTF_r \cdot \mathcal{F}(I_{tn\_r})) \quad (6)$$

$$\mathcal{F}(I_{tn\_g})^{updated} = \mathcal{F}(I_{tn\_g}) + \frac{conj(OTF_g)}{\max(OTF_g)} \cdot (\mathcal{F}(I_{un\_g}) - OTF_g \cdot \mathcal{F}(I_{tn\_g})), \quad (7)$$

where $\mathcal{F}$ denotes the Fourier transform, conj demotes the complex conjugate, and $OTF_r$ and $OTF_g$ denote the incoherent optical transfer function for red light (632 nm) and green light (532 nm) respectively. The update spectrum $\mathcal{F}(I_{tn\_r})^{updated}$ and $\mathcal{F}(I_{tn\_g})^{updated}$ are then transformed back to the spatial domain to produce two updated target images $I_{tn\_r}^{updated}$ and $I_{tn\_g}^{updated}$. These updated target images are used to update the high resolution sample estimates as follow:

$$I_{obj\_r}^{updated} = I_{obj\_r} + \frac{conj(P_n)}{\max(P_n)} \cdot \left(I_{m\_r}^{updated} - I_{obj\_r} \cdot P_n\right) \quad (8)$$

$$I_{obj\_g}^{updated} = I_{obj\_g} + \frac{conj(P_n)}{\max(P_n)} \cdot \left(I_{m\_g}^{updated} - I_{obj\_g} \cdot P_n\right) \quad (9)$$

Lastly, the above Fourier and spatial updating process is repeated for all different illumination patterns and iterated until the solution converges.

Figure 5:
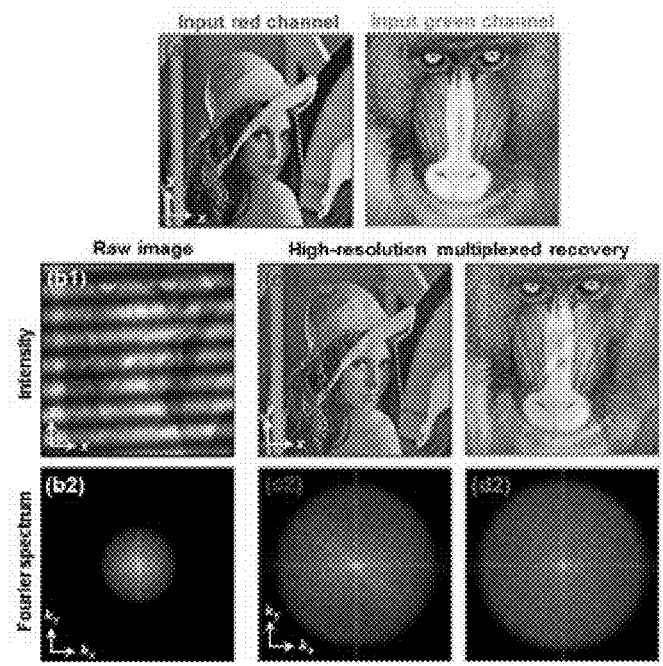
FIG. 5 illustrates the use of the spectrum-multiplexed SFPM scheme for image reconstruction.

FIG. 5 demonstrates the use of the spectrum-multiplexed SFPM scheme for image reconstruction. FIGS. 5 (a1) and (a2) illustrate two input images, corresponding to the red and green wavelengths. FIGS. 5(b1) and (b2) demonstrate the low-resolution raw image and its Fourier spectrum under the sinusoidal illumination pattern. FIGS. 5(c) and (d) show the recovered images and their Fourier spectrum using the spectrum-multiplexed SFPM scheme. As shown in FIG. 5, the report scheme is able to recover images at different wavelengths.

Figure 6:
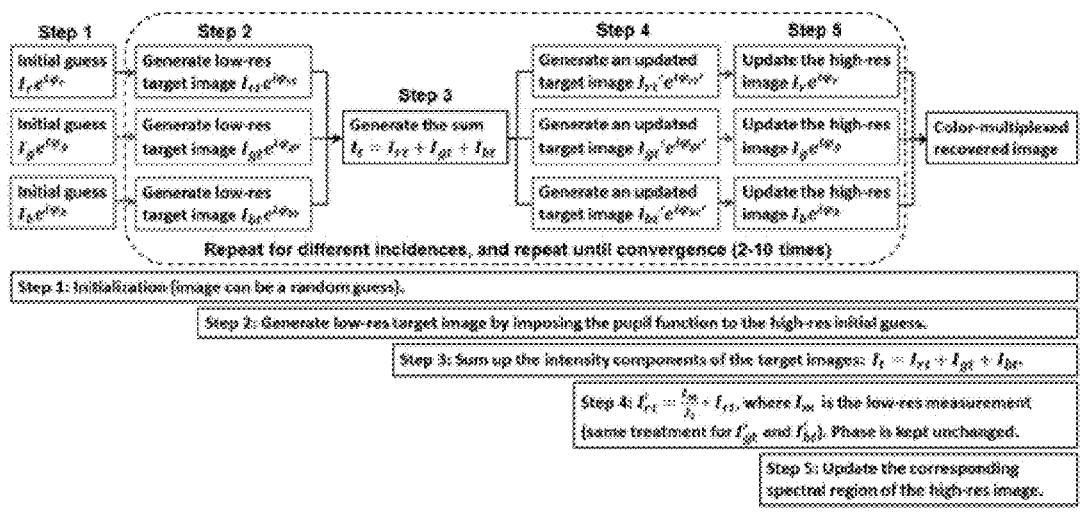
FIG. 6 illustrates the use of spectrum multiplexing in coherent Fourier ptychography with plane wave illuminations.

The spectrum multiplexing scheme discussed above may be generalized for the case of plane-wave illumination (i.e., the case of conventional Fourier ptychography approach). The recovery process of the spectrum-multiplexed Fourier ptychography scheme is similar to that of single-state scheme discussed above in relation to FIG. 1. However, in this case, multiple sample estimates at different wavelengths are used in the workflow. For example, as shown in FIG. 6, it is possible to recover three images at three different wavelengths. Additional wavelengths and images are possible as well.

As shown in FIG. 6, three sample estimates are used to generate the corresponding target images. The intensity components of the target images are summed up to generate the incoherent mixture $I_t$, and the target images are updated using the ratio between the actual measurement $I_m$ and $I_t$. The updated target images are then used to modify the corresponding spectral regions of the sample estimates. The entire process is repeated for all intensity measurements, and iterated for several times until the solution converges. Lastly, the recovered images at different wavelengths are combined to generate a high-resolution color image.

As discussed above, an example system for Fourier microscopy may include (i) an image capture apparatus including an objective lens, (ii) at least one processor, and (iii) data storage including program instructions stored thereon that when executed by the at least one processor, cause the system to: (a) capture, via the image capture apparatus, a plurality of initial images of an object, wherein each of the plurality of initial images of the object have a first resolution, and (b) process each of the plurality of initial images in Fourier space to generate a final image of the object having a second resolution, wherein the second resolution is greater than the first resolution. The image capture apparatus may take various forms.

Figure 7:
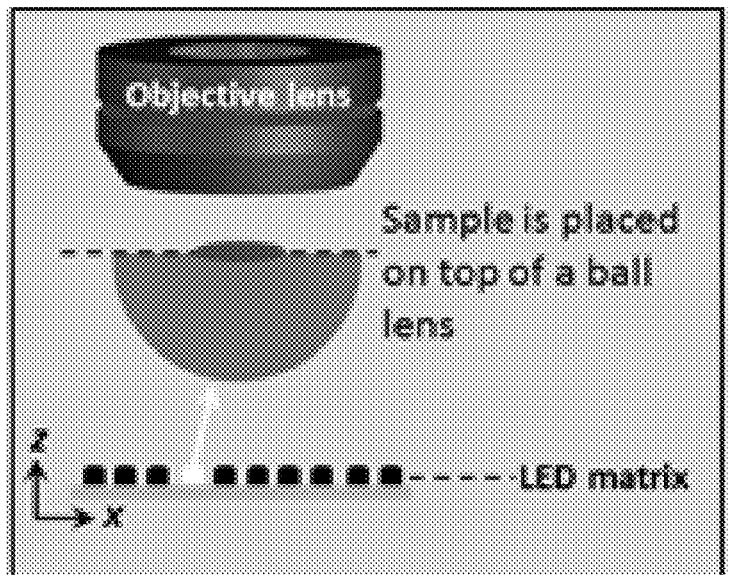
FIG. 7 illustrates a ball-lens based Fourier ptychographic microscopy platform

In one example, as shown in FIG. 7, the image capture apparatus includes an object holding element, a ball lens, wherein the object holding element is located on top of the ball lens, an LED matrix, and an LED matrix switching mechanism, wherein the LED matrix switching mechanism is configured to illuminate a single LED in the LED matrix. The resolution Fourier ptychographic microscope is determined by the transverse wave vector of the incident beam. To improve the resolution, the transverse wave vector can be increased by placing the sample on top of a ball lens. If the refraction index of the ball lens is 'n', the transverse wave vector is increased by a factor of 'n', and thus, the resolution can be increased by a factor of 'n'.

In such an example, capturing the plurality of initial images of the object comprises causing the objective lens to capture an initial image of the object, and repeating this sequence for a number of individual LED elements to capture the plurality of initial images of the object. All captured images are then synthesized in the Fourier space to produce a high-resolution image that bypass the diffraction limit of the objective lens. This scheme can also be extend for any substrates that have a high refraction index.

Figure 8:
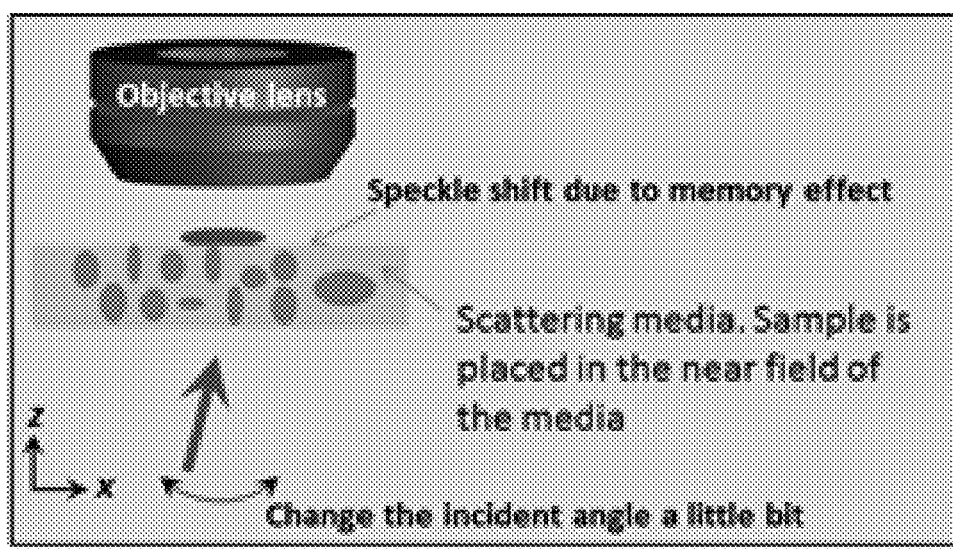
FIG. 8 illustrates a pattern-illuminated Fourier ptychography using memory effect

In another example, as shown in FIG. 8, the image capture apparatus includes an object holding element, scattering media, wherein the object holding element is located on top of the scattering media, and an illumination source having a variable illumination angle with respect to the scattering media. In such an example, capturing the plurality of initial images of the object comprises causing the illumination source to illuminate the scattering media at a first angle such that the objective lens captures an initial, and repeating this sequence for a number of illumination angles of the illumination source to capture the plurality of initial images of the object. By changing the illumination angle of the light wave, the speckle will shift across the sample due to the memory effect. For each illumination angle, one low-resolution image of the sample may be captured. All captured images are then synthesized to produce a high-resolution image that bypass the diffraction limit of the objective lens. The final resolution is determined by the size of the speckle and is decoupled from the numerical aperture of the employed optics.

Figure 9:
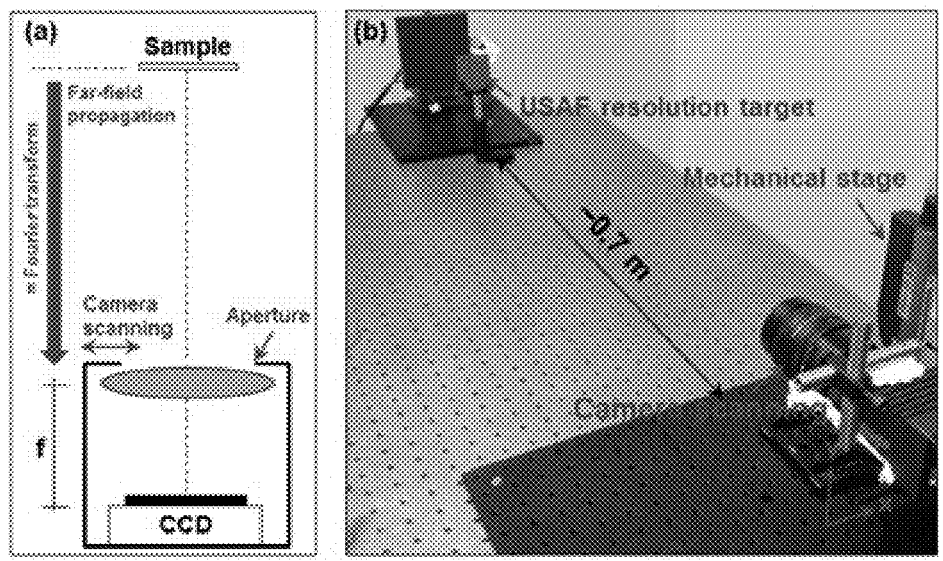
FIG. 9 illustrates a camera scanning Fourier ptychography setup.

In yet another example, as shown in FIG. 9, the image capture apparatus includes an object holding element, and a mechanical stage for holding the objective lens such that the objective lens may be scanned over a number of different x-y positions. In such an example, capturing the plurality of initial images of the object comprises causing the objective lens to capture an initial image of the object at a first x-y position, and repeating this sequence for a number of x-y positions to capture the plurality of initial images of the object. As such, the object is placed at the far field and the objective lens is scanned over different x-y positions to acquire images corresponding to different passbands. Far field propagation is equivalent to performing Fourier transform of the light field. Therefore, the aperture of the objective lens naturally serves as a support constraint at the Fourier space. By scanning the objective lens at different x-y positions, it is possible to synthesize a large passband in the Fourier space, and thus bypass the resolution limit imposed by the photographic lens. All captured images are then synthesized to produce a high-resolution image that bypass the diffraction limit of the objective lens.

In one particular example, a CCD camera may be used as the objective lens, where the CCD camera has a 5.5 μm pixel size and a 50 mm photographic lens with a fixed f-number of 16 (this f-number is chosen to avoid pixel aliasing problem of the image sensor; a smaller f-number can be used with a smaller pixel size). A single LED may be used as the illumination source, with a central wavelength of 632 nm. The step size of the mechanical scan may be 1.2 mm in x and y, and the system may be configured to scan to 7×7 locations, for example.

Figure 10:
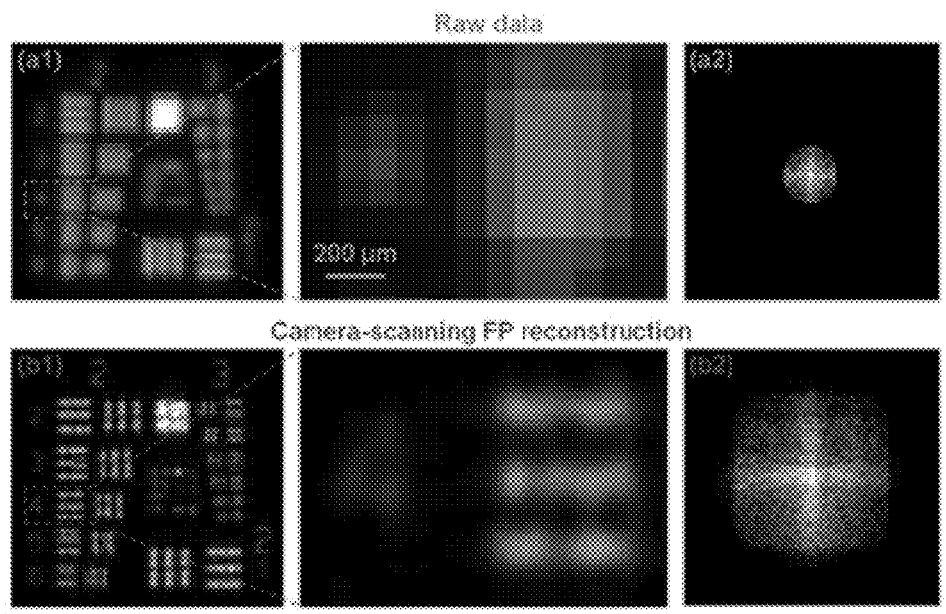
FIG. 10 illustrates the results of the camera scanning Fourier ptychography setup.

FIG. 10 illustrates the results of the objective lens scanning Fourier ptychography setup. FIG. 10(a1) displays a section of one of the objective lens's raw images, and FIG. 10(a2) shows the magnitude of its corresponding spectrum in Fourier space (on a log scale). FIG. 10(b1) displays an example Fourier ptychography reconstruction from all 49 images from the 7×7 scan, while the corresponding magnitude of this reconstructed image's spectrum is in FIG. 11(b2). As shown in FIG. 10, the reported scheme is able to generate a final image with a resolution greater than that of the objective lens.

Figure 11:
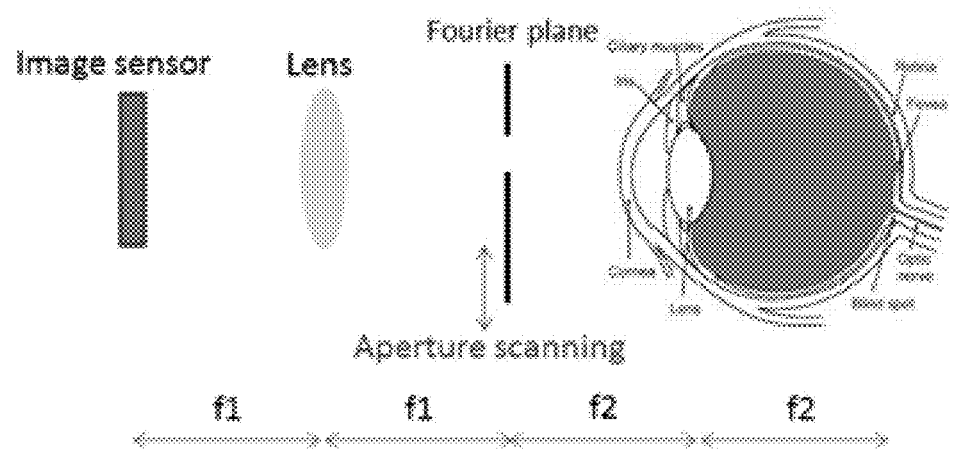
FIG. 11 illustrates a 3D fundus imaging using aperture scanning Fourier ptychography.

In another example, as shown in FIG. 11, the image capture apparatus includes an image sensor, and a moveable aperture, wherein the objective lens is positioned between the image sensor and the aperture. In such an example, capturing the plurality of initial images of the object comprises causing the objective lens to capture an initial image of the object as the moveable aperture is in a first position, and repeating this sequence for a number of moveable aperture positions to capture the plurality of initial images of the object.

As shown in FIG. 11, the Fourier ptychographic imaging scheme may be used for 3D fundus imaging. In this scheme, an aperture is placed at the front focal plane of the eye (or other object). A lens may then be used to relay this aperture plane to the image sensor. The arrangement of the image sensor, the lens, the aperture, and the eye is shown in FIG. 11, where they form a 4f system. For each position of the aperture, an image is captured of the retina of the eye. All captured images are then synthesized to produce a high-resolution image that bypass the diffraction limit of the objective lens. In such an example, a phase factor may be introduced to compensate the aberration introduced by the eye. The complex image can also be refocused along the optical axis to examine the 3D structure of the eye.

Figure 12:
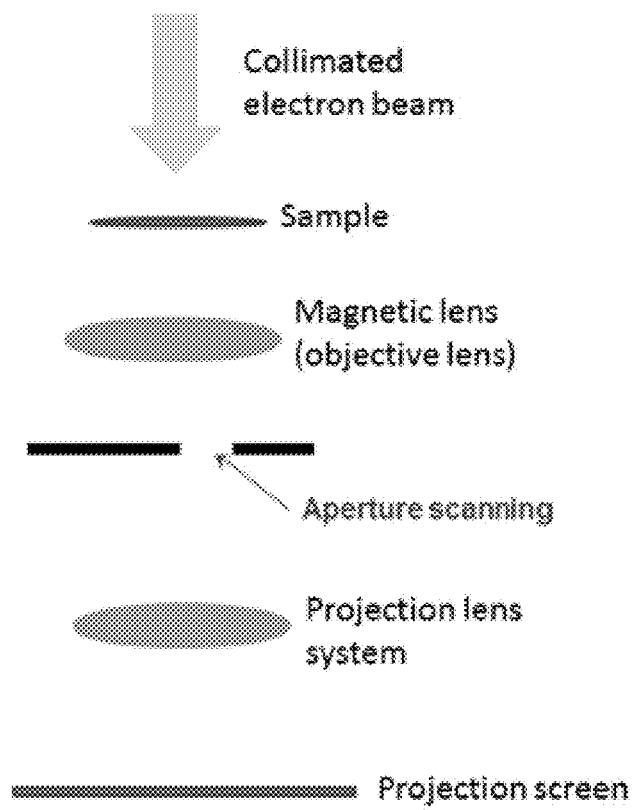
FIG. 12 illustrates an aperture-scanning Fourier ptychography for transmission electron microscopy.

In most commercially available TEM platforms, aperture scanning at the Fourier plane is a routine functionality for dark field imaging. In such an example, as shown in FIG. 12, the image capture apparatus includes a projection screen, a projection lens system, and an aperture positioned between the objective lens and the projection lens system, wherein the projection lens system is positioned between the aperture and the projection screen. In such an example, capturing the plurality of initial images of the object comprises causing the objective lens to capture an initial image of the object as the aperture is in a first position, and repeating this sequence for a number of aperture positions to capture the plurality of initial images of the object. In this process, the aperture may be arranged to overlap with the adjacent position for more than 30%. All captured images are then synthesized in the Fourier domain to generate a high-resolution complex image of the sample. In such an example, a phase factor can be introduced to compensate the aberrations of the employed lens. The recovered complex image can also be propagated to different planes along the z-axis.

Figure 13:
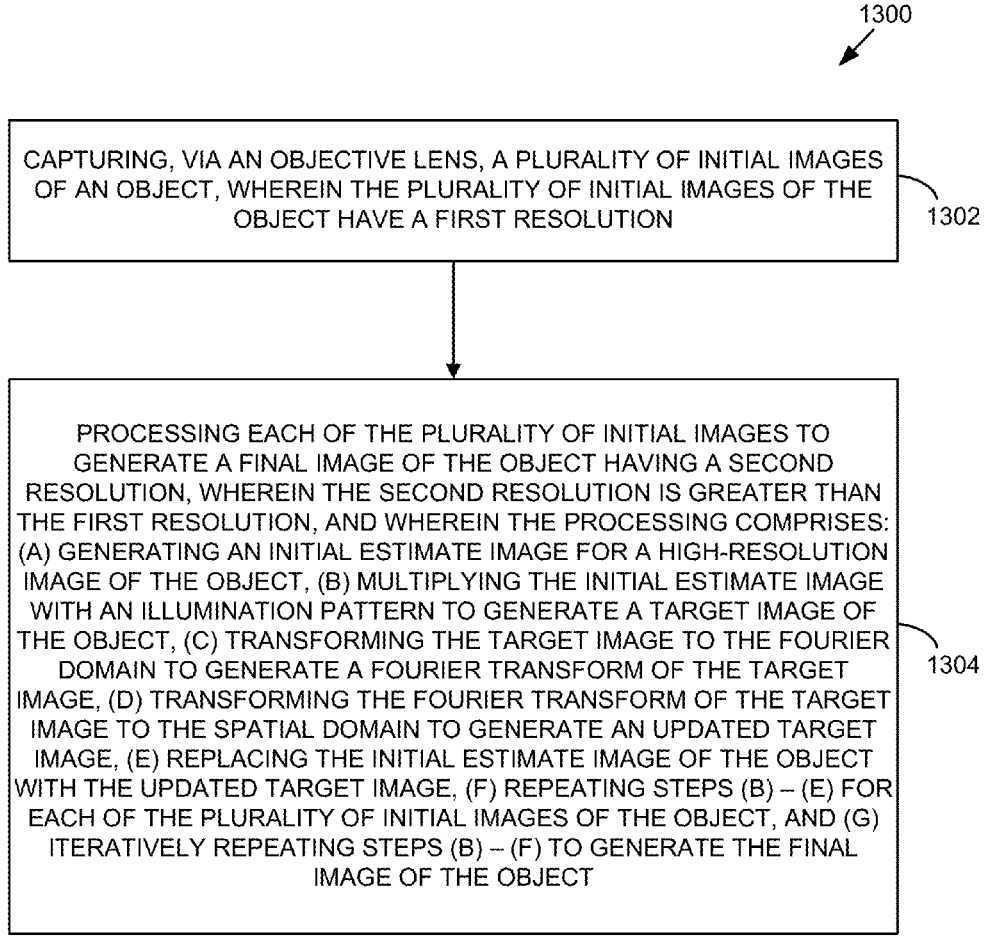
FIG. 13 is a block diagram of an example method for structured-illumination-based Fourier microscopy.

FIG. 13 is a block diagram of an example method 1300 for structured-illumination-based Fourier microscopy. The method shown in FIG. 13 presents an embodiment of a method that could be used by one or more of the systems described above. The example method 1300 may include one or more operations, functions, or actions as illustrated by the blocks in FIG. 13. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method and other processes and methods disclosed herein, each block in FIG. 13 may represent circuitry that is wired to perform the specific logical functions in the process.

Initially, at block 1302, the method 1300 includes capturing, via an objective lens, a plurality of initial images of an object, wherein the plurality of initial images of the object have a first resolution. The plurality of initial images may be captured using any of the methods and systems described above. At block 1304, the method 1300 continues with processing each of the plurality of initial images to generate a final image of the object having a second resolution, wherein the second resolution is greater than the first resolution, and wherein the processing comprises: (a) generating an initial estimate image for a high-resolution image of the object, (b) multiplying the initial estimate image with an illumination pattern to generate a target image of the object, (c) transforming the target image to the Fourier domain to generate a Fourier transform of the target image, (d) transforming the Fourier transform of the target image to the spatial domain to generate an updated target image, (e) replacing the initial estimate image of the object with the updated target image, (f) repeating steps (b)-(e) for each of the plurality of initial images of the object, and (g) iteratively repeating steps (b)-(f) to generate the final image of the object.

Figure 14:
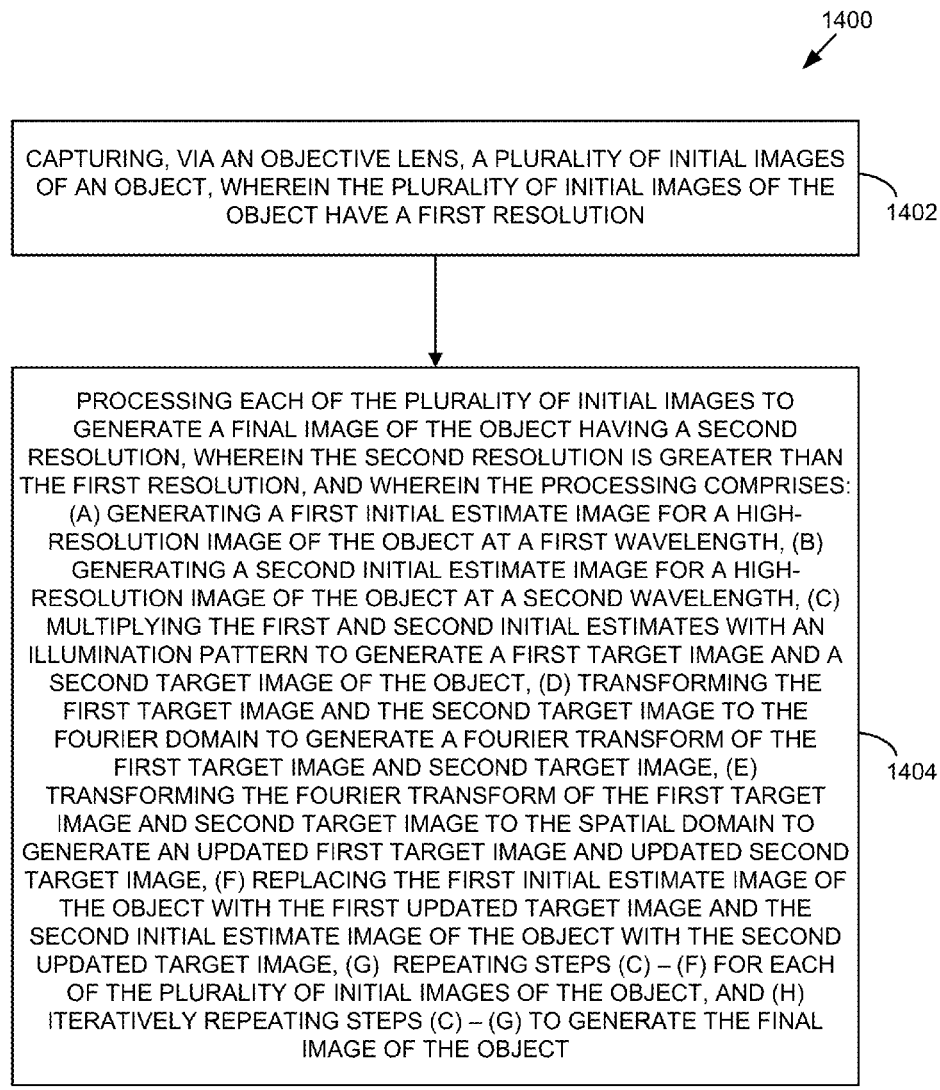
FIG. 14 is a block diagram of an example method for spectrum multiplexing in structured-illumination-based Fourier microscopy.

FIG. 14 is a block diagram of another example method 1400 spectrum multiplexing in structured-illumination-based Fourier microscopy. Method 1400 may include one or more operations, functions, or actions as illustrated by one or more of blocks 1402-1404. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Initially, at block 1402, the method 1400 includes capturing, via an objective lens, a plurality of initial images of an object, wherein the plurality of initial images of the object have a first resolution. At block 1404, the method 1400 continues with processing each of the plurality of initial images to generate a final image of the object having a second resolution, wherein the second resolution is greater than the first resolution, and wherein the processing comprises: (a) generating a first initial estimate image for a high-resolution image of the object at a first wavelength, (b) generating a second initial estimate image for a high-resolution image of the object at a second wavelength, (c) multiplying the first and second initial estimates with an illumination pattern to generate a first target image and a second target image of the object, (d) transforming the first target image and the second target image to the Fourier domain to generate a Fourier transform of the first target image and second target image, (e) transforming the Fourier transform of the first target image and second target image to the spatial domain to generate an updated first target image and updated second target image, (f) replacing the first initial estimate image of the object with the first updated target image and the second initial estimate image of the object with the second updated target image, (g) repeating steps (c)-(f) for each of the plurality of initial images of the object, and (h) iteratively repeating steps (c)-(g) to generate the final image of the object.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense. Further, it is intended to be understood that the following clauses (and any combination of the clauses) further describe aspects of the present description.

We claim:

1. A system for Fourier ptychographic microscopy, the system comprising:
    an image capture apparatus including an objective lens;
    at least one processor; and
    data storage including program instructions stored thereon that when executed by the at least one processor, cause the system to:
        capture, via the image capture apparatus, a plurality of initial images corresponding to different regions of the Fourier space of an object, wherein each of the plurality of initial images of the object have a first resolution; and
        process each of the plurality of initial images in Fourier space to generate a final image of the object having a second resolution, wherein the second resolution is greater than the first resolution.

2. The system of claim 1, wherein the image capture apparatus comprises:
    an object holding element;
    a ball lens, wherein the object holding element is located on top of the ball lens;
    an LED matrix; and
    an LED matrix switching mechanism, wherein the LED matrix switching mechanism is configured to illuminate a single LED in the LED matrix.

3. The system of claim 2, wherein capturing the plurality of initial images of the object comprises:
    causing the LED matrix switching mechanism to illuminate a single LED in the LED matrix;
    causing the objective lens to capture an initial image of the object; and
    repeating this sequence for a number of individual LED elements to capture the plurality of initial images of the object.

4. The system of claim 1, wherein the image capture apparatus comprises:
    an object holding element;
    scattering media, wherein the object holding element is located on top of the scattering media; and
    an illumination source having a variable illumination angle with respect to the scattering media.

5. The system of claim 4, wherein capturing the plurality of initial images of the object comprises:
    causing the illumination source to illuminate the scattering media at a first angle such that the objective lens captures an initial image of the object; and
    repeating this sequence for a number of illumination angles of the illumination source to capture the plurality of initial images of the object.

6. The system of claim 1, wherein the image capture apparatus comprises:
    a camera or camera array;
    an object holding element configured to hold the object;
    a coherent illumination beam incident on the object; and
    a mechanical stage for holding the camera or camera array such that the camera or camera array is scanned over a number of different x-y positions.

7. The system of claim 6, wherein capturing the plurality of initial images of the object comprises:
    causing the camera or camera array to capture one or more initial images of the object at a first x-y position; and
    repeating this sequence for a number of x-y positions to capture the plurality of initial images of the object.

8. The system of claim 1, wherein the image capture apparatus comprises:
    an image sensor; and
    a moveable aperture, wherein the objective lens is positioned between the image sensor and the aperture, wherein the object comprises an eye including a retina, and wherein the moveable aperture is positioned at a front focal plane of the eye, and wherein the moveable aperture is scanned over a number of different positions at the front focal plane of the eye.

9. The system of claim 8, wherein capturing the plurality of initial images of the object comprises:
    causing the image sensor to capture an initial image of the retina as the moveable aperture is in a first position;
    repeating this sequence for a number of moveable aperture positions to capture the plurality of initial images of the retina;
    introducing a phase factor to compensate for aberrations of the eye; and
    synthesizing the plurality of initial images in the Fourier space to produce a high-resolution complex fundus image of the eye.

10. The system of claim 1, wherein the image capture apparatus comprises:
    a projection screen;
    a projection lens system; and an aperture positioned between the objective lens and the projection lens system, wherein the projection lens system is positioned between the aperture and the projection screen.

11. The system of claim 10, wherein capturing the plurality of initial images of the object comprises:
causing the objective lens to capture an initial image of the object as the aperture is in a first position; and
repeating this sequence for a number of aperture positions to capture the plurality of initial images of the object.

12. The system of claim 1, wherein the program instructions are further executable by the at least one processor to cause the system to:
introduce one or more phase factors to compensate for one or more aberrations of the objective lens.

13. The system of claim 1, wherein the program instructions are further executable by the at least one processor to cause the system to:
propagate the final image to different planes along the z-axis.

14. The system of claim 1, wherein the program instructions are further executable by the at least one processor to cause the system to:
render the final image of the object for display.

15. A method for structured-illumination-based Fourier pyptychography, the method comprising:
capturing, via an objective lens, a plurality of initial images of an object, wherein the plurality of initial images of the object have a first resolution; and
processing each of the plurality of initial images to generate a final image of the object having a second resolution, wherein the second resolution is greater than the first resolution, and wherein the processing comprises:
(a) generating an initial estimate image for a high-resolution image of the object;
(b) multiplying the initial estimate image with an illumination pattern to generate a target image of the object;
(c) transforming the target image to the Fourier domain to generate a Fourier transform of the target image;
(d) transforming the Fourier transform of the target image to the spatial domain to generate an updated target image;
(e) replacing the initial estimate image of the object with the updated target image;
(f) repeating steps (b)-(e) for each of the plurality of initial images of the object; and
(g) iteratively repeating steps (b)-(f) to generate the final image of the object.

16. The method of claim 15, wherein the illumination pattern includes high-frequency components.

17. The method of claim 15, wherein the illumination pattern is a sinusoidal illumination pattern.

18. The method of claim 15, further comprising:
rendering the final image of the object for display.

19. A method for spectrum multiplexing in structured-illumination-based Fourier ptychography, the method comprising:
capturing, via an objective lens, a plurality of initial images of an object, wherein the plurality of initial images of the object have a first resolution; and
processing each of the plurality of initial images to generate a final image of the object having a second resolution, wherein the second resolution is greater than the first resolution, and wherein the processing comprises:
(a) generating a first initial estimate image for a high-resolution image of the object at a first wavelength;
(b) generating a second initial estimate image for a high-resolution image of the object at a second wavelength;
(c) multiplying the first and second initial estimates with an illumination pattern to generate a first target image and a second target image of the object;
(d) transforming the first target image and the second target image to the Fourier domain to generate a Fourier transform of the first target image and second target image;
(e) transforming the Fourier transform of the first target image and second target image to the spatial domain to generate an updated first target image and updated second target image;
(f) replacing the first initial estimate image of the object with the first updated target image and the second initial estimate image of the object with the second updated target image;
(g) repeating steps (c)-(f) for each of the plurality of initial images of the object; and
(h) iteratively repeating steps (c)-(g) to generate the final image of the object.

20. The method of claim 19, further comprising:
rendering the final image of the object for display.

* * * * *